March 23, 1965  H. D. HOEKSTRA  3,174,710
TAKE-OFF SAFETY INDICATOR

Filed July 23, 1957  3 Sheets-Sheet 1

INVENTOR
Harold D. Hoekstra
BY Arthur Vinograd
Leonard K. Stoll
ATTORNEYS

March 23, 1965  H. D. HOEKSTRA  3,174,710
TAKE-OFF SAFETY INDICATOR

Filed July 23, 1957  3 Sheets-Sheet 2

INVENTOR
Harold D. Hoekstra
BY Arthur Vinograd
Leonard F. Stoll
ATTORNEYS

March 23, 1965  H. D. HOEKSTRA  3,174,710
TAKE-OFF SAFETY INDICATOR
Filed July 23, 1957  3 Sheets-Sheet 3

INVENTOR
Harold D. Hoekstra
BY Arthur Vinograd
Leonard F. Stoll
ATTORNEYS 3,174,710
TAKE-OFF SAFETY INDICATOR
Harold D. Hoekstra, 253 N. Columbus St.,
Arlington 3, Va.
Filed July 23, 1957, Ser. No. 673,746
13 Claims. (Cl. 244—76)
(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952) Section 266.

The present invention relates to a speed-distance indicating mechanism and especially contemplates an instrument to facilitate determination of the safe take-off speed of an airplane.

The instrument of the present invention automatically compares the airspeed of an airplane as it advances along a runway during take-off roll with the known critical velocity-take-off distance characteristic of the particular plane under specified conditions, and continuously advises the pilot as to the actual speed of the airplane in relation to the runway distance used.

Under present practice, determination of whether take-off once started from a specific runway length can be safely accomplished depends largely on pilot judgment which in turn is based on a rapid mental summary of information obtained from the airspeed and engine power indicators together with knowledge concerning known performance characteristics of the particular type of airplane.

With the increasing use of larger, heavier and faster plane types, pilot judgment is no longer adequate and various means have been devised and proposed for facilitating the estimation of take-off conditions. In particular, some airports provide spaced markers along the length of the runway which serve as minimum speed reference points. Such systems require visual observation by the pilot and comparison with the airspeed indicator. In addition, the pilot must still mentally retain information concerning the take-off characteristics of the airplane.

There are no means available, so far as is known, which will automatically and continuously correlate the airspeed of a plane at any particular instant during the take-off roll with the airplane's position on the runway and compare such information with the airplane take-off characteristics. The present invention has the advantage of providing the pilot with accurate and continuous information of the speed of the plane in relation to the length of the runway used so that he is continuously and instantaneously kept advised whether the conditions are right to continue take-off.

It is accordingly an immediate object of the present invention to provide an instrument which will automatically keep the pilot of an airplane advised of conditions necessary for safe take-off for a specific runway length.

A further object of this invention is to provide a mechanism which automatically and continuously compares the measured airspeed of an airplane with known take-off roll characteristics data for a particular plane type under particular conditions.

A still further object of this invention is to provide an instrument for use in connection with airplane take-off which automatically and continuously correlates the speed of a plane during take-off roll with the running distance covered.

Still another object of this invention is to provide an instrument for use in an airplane during take-off roll which will automatically warn the pilot if the aircraft speed in relation to runway distance falls below a predetermined value.

Flight procedures governing multi-engine aircraft types, may under certain conditions, require take-off despite failure of one or more engines during take-off. That is, if a multi-engine aircraft has advanced a sufficient distance along its take-off roll before engine failure, size limitations of the airport may indicate that it is safer to continue take-off than to attempt to decelerate during the limited distance remaining on the runway.

The present invention therefore also contemplates, in one form, a modification which provides an indication of the safe climb-out speed of a multi-engine aircraft following failure of a portion of the total engine power.

In accordance with still another modification, the invention is directed to means for automatically controlling the engine control throttle in accordance with the power requirements for a particular take-off.

The above objects and other objects to which reference will be made in the ensuing disclosure, are accomplished by a combination and arrangement of elements and instrumentalities of which a preferred embodiment is illustrated in the accompanying drawings in which.

Figure 1:
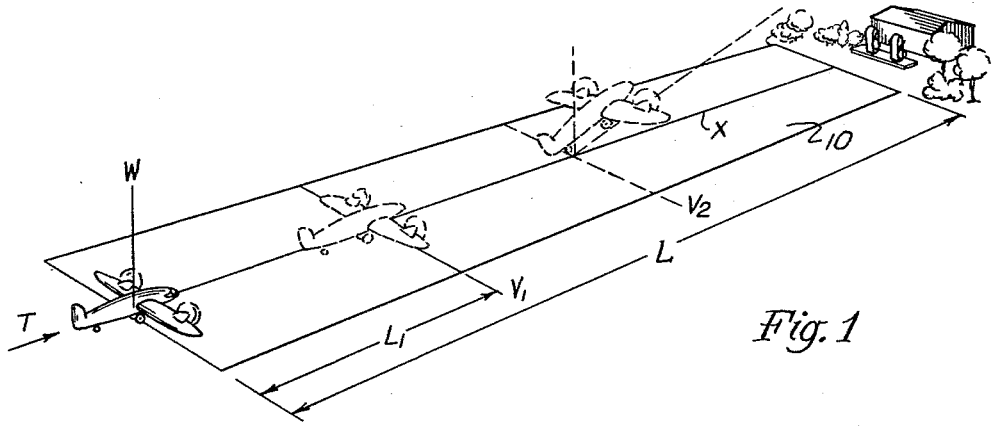
FIG. 1 is a symbolic representation of the take-off conditions in a typical airport.

In accelerating an aircraft from rest to take-off speed, a minimum runway distance for take-off roll is required depending on the type of aircraft, its loading atmospheric conditions, and other factors. The factors involved in a take-off problem are illustrated in FIG. 1 in which a runway 10 having a maximum usable length represented by L is portrayed. The weight of the aircraft is designated by W and the forward thrust by T. With jet propulsion, the thrust T remains nearly constant throughout take-off; in propeller driven planes, the thrust reduces with the speed. In either case, however, the relationship between distance advanced along the runway and airspeed at a corresponding distance can be manifested by a velocity distance history curve of the type illustrated by FIG. 3.

In FIG. 1 the distance $L_1$ and the corresponding velocity $V_1$ designate the highest speed and corresponding distance points from which the aircraft can be safely decelerated to a stop within the remaining runway length. In connection with multi-engine ircraft, $L_1$ and $V_1$ represent the respective distances and velocity beyond which acceleration may be continued in the event of partial engine failure until a safe climb-out speed $V_2$ is reached and the aircraft is started on its climb.

Figure 3:
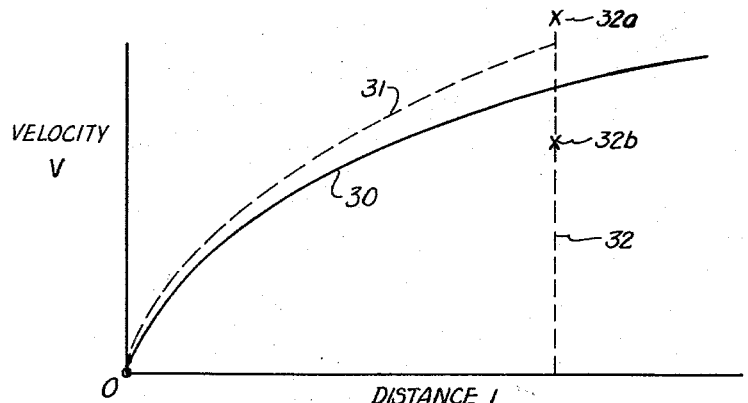
FIG. 3 is a diagram showing the velocity history of acceleration of a particular airplane type.

FIG. 3 is a velocity history of acceleration during take-off roll of a particular type of airplane. Such history is obtained from actual tests and computations involving factors such as atmospheric density, pressure, and temperature, weight, rolling resistance, aerodynamic resistance, wind, airport altitude, runway gradient, power changes etc. Such data is available for different types of aircraft and for different plane loadings in connection with a particular aircraft type.

Curve 30 in FIG. 3 shows the relation between velocity expressed as an ordinate and distance from start (take-off roll) expressed as an abscissa. Such data has been obtained from actual tests for various aircraft types under different loading conditions. Moreover, it can be shown that if the distance-velocity characteristic curve for a maximum take-off weight for a particular airplane type is represented by a curve such as 30 in FIG. 3, then the characteristic curves for lower weights will have the same general shape but will be obviously of greater slope as indicated by curve 31 in FIG. 3.

The curve of greater slope 31 may be simulated accurately enough for the purposes of this invention by rotation of curve 30 about a point close to its origin O.

Finally, it can be shown that the curve 30 can be generated so as to take into account the characteristics of a particular runway which may have not only a gradient or incline along its length but variations in such gradient or incline.

In many operations, both civilian and military, the plane load is limited by runway length. The referred-to performance computations and tests will indicate the plane load that can be airborne on a particular runway length under various temperature, barometer, and wind conditions. Such performance characteristics can readily be reduced to the runway speed and distance relationship embodied in the referred-to characteristic curves of FIG. 3. The present invention provides means for continuously and automatically correlating the performance characteristics information with the measured airspeed as the plane advances along the runway during its take-off roll.

Figure 4:
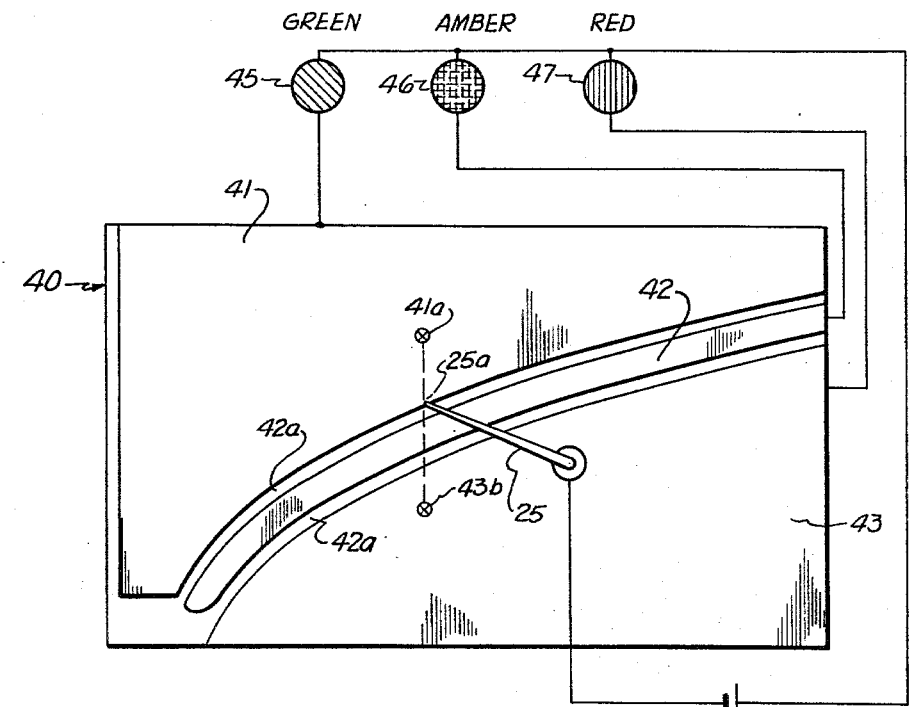
FIG. 4 is a schematic illustrating the electrical circuit involved in the mechanism of FIG. 2.

A convenient means for representing the known performance characteristic discussed in connection with FIG. 3 is illustrated in FIG. 4 in which the velocity-distance characteristic curve 42 as well as the areas 41 and 43 above and below the curve 42 are embodied in the form of electrically conducting coatings, electrically separated one from the other by the insulated areas 42a provided by function card 40.

The conducting surfaces are provided on a base of insulating material. Conventional printed circuitry or photoetching may be employed in forming the function card 40 as is well known.

FIG. 4 also shows how the function card may be integrated into an electrical indicating circuit. For this purpose a sensing finger 25 which will be described in greater detail in connection with FIG. 2 may be pivotally mounted adjacent the face of the function card. The sensing finger is connected to a source of current 44.

A plurality of indicating lights 45, 46, and 47 corresponding to each of the referred-to conducting areas 41, 42, and 43 respectively are included in the circuit. A green light 45 connects the conducting surface 41 to the voltage source 44; an amber light 46 connects the conducting surface 42 to the source 44 and a red indicator lamp 47 is employed to connect the conducting surface 43 to the voltage source.

The sensing finger 25 is preferably constructed so that the end portion 25a can make electrical contact with the face of the function card 40. It will therefore be apparent that energization of one of the indicator lamps 45–47 will correspond to the particular one of the conducting surfaces contacted by the sensing finger 25.

The velocity-distance curve shown in FIG. 3, as already described, graphically illustrates the speed that an airplane must maintain during a take-off roll to attain a minimum take-off climb speed. Considering any distance measured along the abscissa in FIG. 3, such as the distance represented by line 32, it will be apparent that curve 30, for example, defines a minimum speed break-point between a more-than-safe speed represented by a position 32a above the curve and a less-than-safe speed indicated by point 32b below the curve 30.

Such manifestations are physically embodied by the mechanism illustrated in FIG. 4. Since the conducting surface strip 42 corresponds to the curve 30 in FIG. 3, it will be apparent that the symbolized surface spots 41a, and 43b above and below the surface 42 as shown in FIG. 4 will functionally correspond to the safe and unsafe speed points 32a, 32b discussed in connection with FIG. 3. Hence, when the sensing finger 25 contacts an area such as 41a, the green light 45 will be illuminated indicating that conditions for attaining a minimum take-off speed are more than safe.

When the sensing finger is in a position of contact corresponding to the incremental area 43b, the red light 47 will be illuminated indicating a safe take-off speed will not be obtained. Contact between the function area 42 and the sensing finger 25 will similarly produce illumination of the amber light 46 indicating a probably safe condition for take-off. The significance of such indications will become further apparent in connection with the mechanism shown in FIG. 2.

Briefly, it will be clear from FIG. 4, that if the function card 40 is displaced in a horizontal direction to the left, as viewed in FIG. 4 relative to sensing finger 25 and the finger 25 is displaced proportional to the measured airspeed of the airplane, the ordinate location of the areas or spots 41a etc. on the card 40 contacted by the finger 25 will correspond to the particular speed of the airplane. It will also be apparent that such ordinate locations will be defined relative to the optimum velocity area included in the surface portion 42 of the card. The lights 45–47 will therefore indicate whether the speed of the airplane at a particular roll distance is above, equal to, or below the minimum take-off climb speed for the particular plane concerned.

Figure 2:
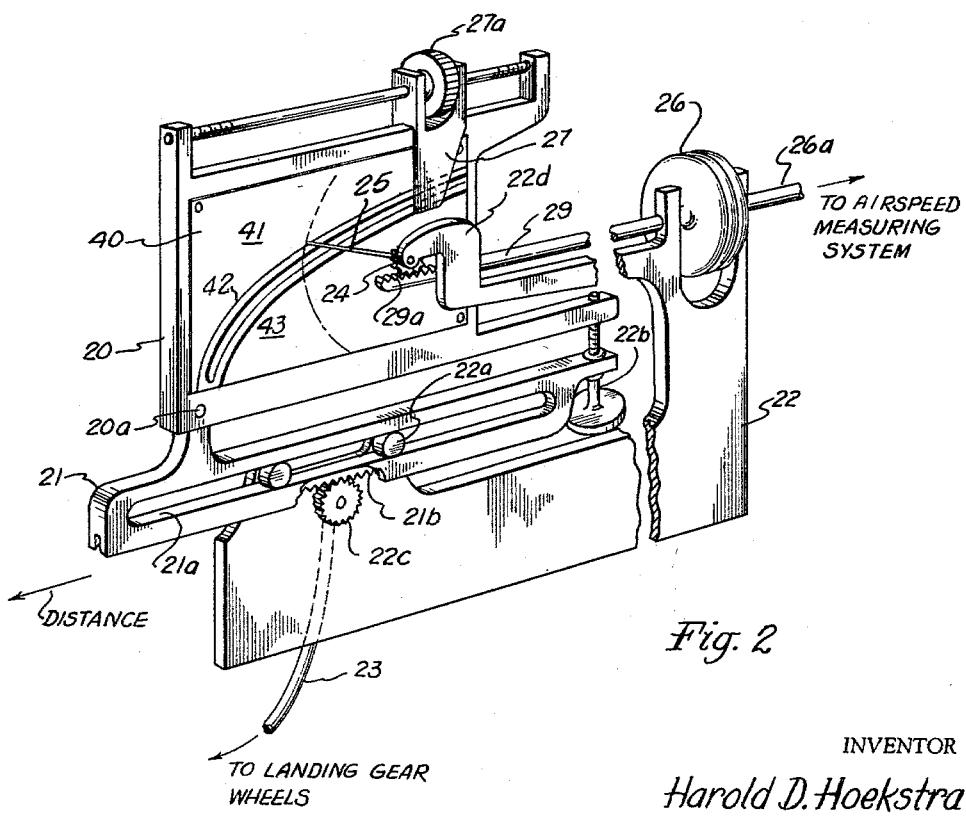
FIG. 2 is a view showing an embodiment of the mechanism of the present invention.

The function card 40 detailed in FIG. 4 is shown in FIG. 2 as being mounted on a carrier frame 20. The carrier frame 20 is pivotally mounted by means of a pintle 20a on a take-off roll register member 21. The take-off roll register member 21 is slidably mounted on a support 22 by means of a slot 21a and guide rollers 22a. A rack 21b is provided lengthwise of the register member 21 and is engageable with a pinion 22c carried by the support 22.

Pinion 22c is connected by a suitable mechanical transmission such as is represented by flexible cable 23 to the landing gear wheels of the aircraft. It will be apparent that by such arrangement, and the selection of suitable gear ratios the displacement L of an airplane during take-off roll as measured by the landing gear wheels will be reflected by a translation of the take-off roll register 21 in the direction of the arrow in FIG. 2 to produce the function described in connection with FIG. 4.

One end of the carrier frame 20 is connected to an adjusting screw 22b rotatably mounted on the register member 21. By manipulating the adjusting screw 22b, the frame 20 together with function card 40 can be positioned at different angular positions relative to register member 21 about pivot point 20a which approximates origin point O in FIG. 3. By referring briefly to FIG. 3 in which the characteristic curves 30, 31 for different airplane loadings are indicated as differing only in slope characteristics, it will be apparent that a transfer of the function characteristic of curve 30 to those of curve 31 can be effected by rotating the curve counterclockwise with respect to origin point O.

The referred-to pivotal connection 20a between frame 20 and register member 21 in FIG. 4 provides for such adjustment of the characteristic curve. In this manner a single function card can serve to define the velocity history of an airplane for various load conditions since by manipulating the adjusting screw 22b, function curves of different slope characteristic are obtainable.

An arm 22d forming an extension of the support 22 extends in the region of the function card 40. A pinion 24 is mounted on the end of the arm and the previously referred-to sensing element or finger 25 is secured to the pinion. An aneroid element 26 is suitably mounted on support 22, the aneroid being provided with a rack 29, a portion of which 29a is suitably milled for engagement with pinion 24. The aneroid is connected by means of suitable tubing 26a to the airspeed measuring apparatus of the aircraft.

It will be apparent that the measured airspeed will be reflected as a movement of the end of the sensing element 25 in an ordinate direction relative to function card 40 to produce the function described in connection with FIG. 4.

A lift-off member 27 of electrically nonconductive material is adjustably mounted on frame 20 and may be positioned to a selected longitudinal distance with respect to the origin point represented by pintle 20a on the function card corresponding to the abscissa of the function card, by means of a screw and nut arrangement 27a. The lift-off member 27 is positioned at a distance corresponding to the length L of a particular runway or optionally to any predetermined portion of the length of the runway. When the length L or a predetermined portion of the length of the runway corresponding to lift-off member 27 has been reached the sensing finger 25 will be raised from the function card 40, disconnecting the lights 44, 46, and 47 from the current source 44, thereby indicating that the pre-set distance has been attained.

The operation of the embodiment of the invention shown in FIG. 2 will be obvious from the above description. It will be apparent that the mechanical embodiment of FIG. 2 implements the consideration fully discussed in connection with FIGS. 3 and 4.

Figure 5:
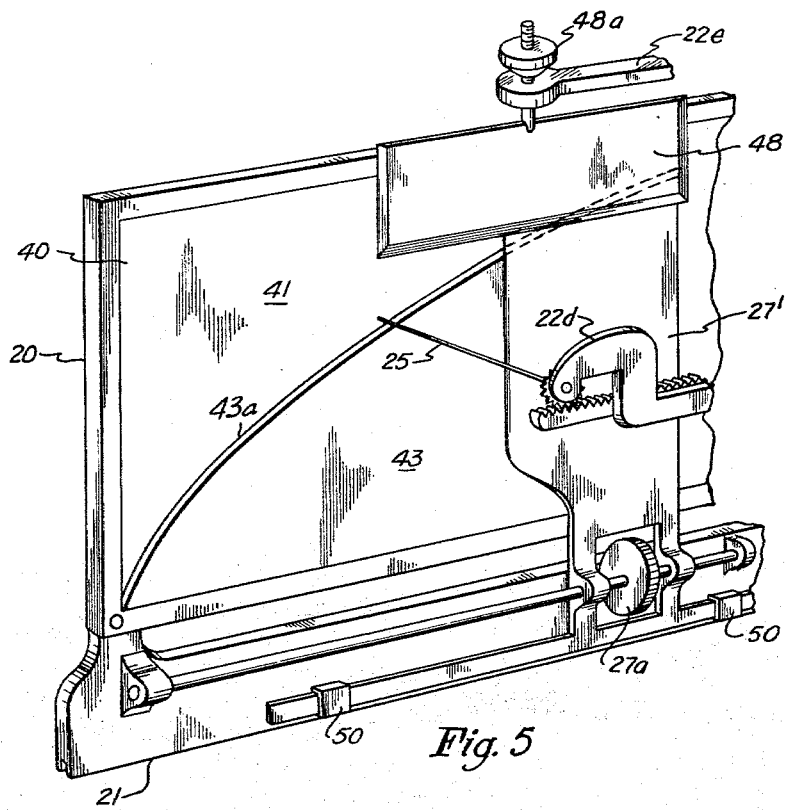
FIG. 5 is a modification of the invention adapted for indicating safe climb-out conditions for a multi-engine aircraft in which partial engine failure occurs during take-off.

A modification of the invention adaptable for indicating take-off for a multi-engine aircraft under conditions of partial engine failure during take-off is illustrated in FIG. 5. The mechanism shown in FIG. 5 is similar to the construction of FIG. 2, like parts being designated with corresponding reference numerals. Referring to FIG. 5, the function card 40 is slightly modified to include only two conducting surfaces 41 and 43 corresponding to the more-than-safe and less-than-safe areas identified in FIGS. 3 and 4. A conducting area corresponding to the velocity-distance function curve is not employed in connection with the modification of FIG. 5, the areas 41 and 43 being placed in close proximity, but separated by nonconducting material 43a, so that their boundary edges are representative of the function curve 42.

In the modification of FIG. 5, the lift-off member 27' is extended in size to cover the vertical extent of the function card 40. As indicated the adjusting nut 27a for positioning lift-off member 27' is mounted on the register member 21 and suitable guides 50 are provided to facilitate sliding adjustment of the lift-off member. In addition a second lift-off member 48 is employed in connection with the modification of FIG. 5. The second lift-off member 48 is suitably supported on a frame 22e forming an extension of the support 22 (FIG. 2) and may be vertically adjusted by means of a speed of climb adjusting nut 48a.

The conducting surfaces 41 and 43 of card 40 are connected to the green and red lights 45 and 47, respectively. The lift-off members 27' and 48 are made of nonconducting material and are therefore insulated from the surface areas 41 and 43. The lift-off members are provided with conducting coatings on their outside surfaces. The lift-off member 27' is connected to the amber light 46 while the second lift-off member is coupled to the green light 45 together with the area 41. The operation of the embodiment follows.

For a particular take-off, the member 27' is positioned corresponding to the distance $L_1$ indicated in FIG. 1 while the second speed of climb take-off member 48 is positioned corresponding to the speed $V_2$ representing the speed for proper climb-out. The remainder of the apparatus functions in the manner described in connection with FIG. 2. Specifically, sensing finger 25 will traverse the function card 40 to provide a green light indication when in contact with area 41 for a safe condition and a red light indication when in contact with area 43 for an unsafe condition. When the preset distance $L_1$ is reached, lift-off member 27' will function to disconnect sensing finger 25 from contact with the function card. Since the conducting surface of lift-off member 27' is connected to amber light 46, the fact that such distance has been reached will be indicated by energization of the amber light.

When the speed of the plane during take-off attains the critical speed $V_2$ lift-off member 48 will function to concurrently disconnect finger 25 from the function card and energize the green indicator light 45 or other indicator.

It will be apparent from the description of the modification shown in FIGS. 2 and 4 that the control signals employed for energizing the indicator lights 45–47 can be utilized in the operation of the airplane to exert a control effect on instrumentalities involved.

Figures 6A, 6B:
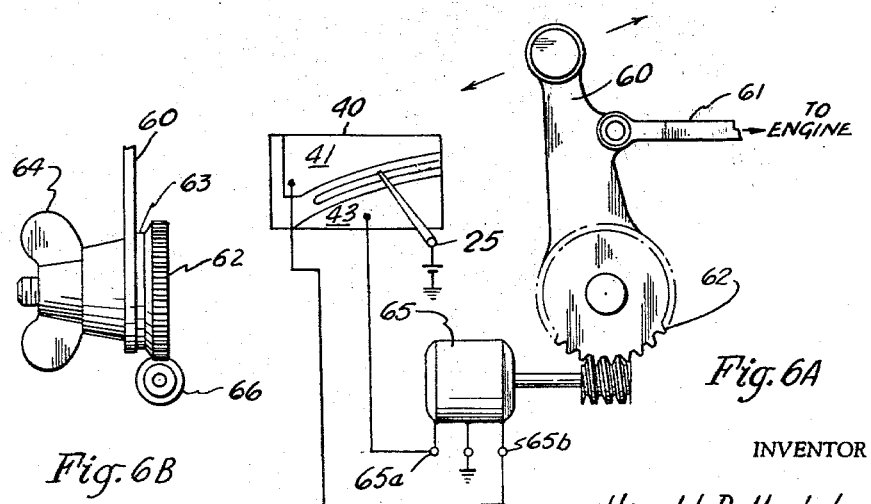
FIGS. 6A and 6B show a further modification of the invention which combines means for controlling engine power during take-off.

A further modification of the invention in which such control effects can be used to automatically control engine power during take-off is illustrated in FIGS. 6A and 6B. The pertinent portions of the mechanism of FIG. 4 are schematically included in FIG. 6A. FIG. 6A shows the conventional engine throttle 60 for controlling engine power. The throttle is connected to the power plant by means of link 61. As indicated in FIG. 6B, the throttle lever 60 is frictionally connected to a worm wheel 62 by means of a friction disc 63 and clamping screw 64. A reversible servo-type motor 65 is adapted to drive the worm wheel 62 and throttle lever by means of a worm gear 66. The motor lead 65a governing forward rotation of the motor is connected to the same energizing circuit for the red indicator light 47 of FIG. 4 while the reverse lead 65b is connected to the energizing source for the green light 45 shown in FIG. 2. Accordingly FIG. 6A shows motor terminals 65a and 65b connected to the conducting areas 41 and 43 respectively of function card 40. Considering the embodiment of FIG. 2, for example it will be apparent that contact of the sensing finger with the area 43 is indicative of insufficient speed. Accordingly, energization of lead 65a in FIG. 6A will cause rotation of the motor 65 in a direction which will increase engine power. Conversely, contact of the sensing finger 25 with conducting area 41 in connection with the described embodiments will indicate that a lower speed will be satisfactory for take-off. Accordingly, the reverse lead 65b in FIG. 6A is automatically energized to reduce the engine power as is clear from FIG. 6A.

The modification of FIGS 6A–6B is particularly efficacious, when excess runway length is available. In such event engine power may be held down thereby increasing engine life and economy and reducing noise.

It will also be apparent that many modifications and alternate mechanization of the particular embodiment exemplified is possible. It will be apparent that there are many applications where the establishment of acceptable predetermined relationships between velocity with distance traversed by a vehicle is desirable. The present device provides means for continuously comparing the actual velocity of a vehicle and distance relationship with an acceptable value. The acceleration needed in a vehicle in order to fit into a particular traffic pattern is one example.

It will therefore be apparent that the embodiments shown are only exemplary and that various modifications can be made in construction and arrangement within the scope of invention as defined in the appended claims.

What is claimed is:

1. An aircraft instrument for continuously indicating the relationship between the actual speed and the desired speed of an aircraft as a function of the distance traveled by said aircraft from a reference point on a runway during take-off, comprising programming means for storing values of desired speeds as a function of distance of said aircraft from the reference point, means for continuously measuring the distance of said aircraft from said reference point during take-off, means for continuously measuring the speed of said aircraft during take-off, and means for continuously comparing the measured speed and the stored speed for the measured distance from said reference point during take-off.

2. In the device set forth in claim 1, means connected to and responsive to the output of said comparing means for controlling the speed of said vehicle.

3. The instrument set forth in claim 1 including means for indicating when said aircraft has attained a selected speed and means for selecting said selected speed.

4. The instrument set forth in claim 1 including means for indicating the attainment of a predetermined distance from the reference point by said aircraft and means for selecting said predetermined distance.

5. The instrument set forth in claim 4 including means for indicating when said aircraft has attained a selected speed and means for selecting said selected speed.

6. A device for correlating the speed of a vehicle with the distance traversed in accordance with a predetermined speed-distance characteristic comprising: a movable member having inscribed on a selected surface thereof desired speed as a function of distance from a reference point, a movable finger having an end positioned in contact with said selected surface, means for measuring the instantaneous speed of said vehicle, means for displacing said finger in the coordinate direction representing speed in dependency upon the value of said instantaneous speed, means for measuring the instantaneous distance of the vehicle from said reference point, means for moving said movable member in the coordinate direction representing distance in dependency upon the value of said instantaneous distance, and comparing means connected between said surface and finger for comparing the values of said instantaneous speed and the desired speed at said instantaneous distance.

7. In the device set forth in claim 6, means connected to said comparing means for indicating whether said instantaneous speed is greater than, equal to, or less than the desired speed at said instantaneous distance.

8. In the device set forth in claim 6, means connected to said movable member for adjusting the position of said member in dependency upon the load of said vehicle.

9. In the device set forth in claim 6, means for deactivating said sensing finger after said vehicle has traversed a selected distance from said reference point, and adjustable means for selecting said selected distance.

10. In the device set forth in claim 6, means for deactivating said sensing finger after said vehicle has attained a selected speed, and adjustable means for selecting said selected speed.

11. In the device set forth in claim 10, means for deactivating said sensing finger after said vehicle has traversed a selected distance from said reference point, and adjustable means for selecting said selected distance.

12. A device for correlating the speed of a vehicle with the distance traversed from a reference point in accordance with a predetermined minimum speed-distance characteristic comprising: a movable member having a selected surface of conductive material, a curve of nonconductive material representing minimum speed as a function of said distance positioned on said selected surface, a movable finger having an end positioned in contact with said selected surface, means for measuring the instantaneous speed of said vehicle, means for displacing said finger in the coordinate direction representing speed in dependency upon the value of said instantaneous speed, means for measuring the instantaneous distance of the vehicle from said reference point, means for moving said movable member in the coordinate direction representing distance in dependency upon the value of said instantaneous distance, and comparing means connected between said surface and finger for comparing the values of said instantaneous and minimum speed at said instantaneous distance.

13. A device for correlating the speed of a vehicle with the distance traversed in accordance with a predetermined optimum speed-distance characteristic comprising: a movable member having a first, second, and third area of conductive material on a selected surface, said second area being shaped to represent optimum speed as a function of distance from a reference point, a fourth area of nonconductive material positioned between said first and second area, a fifth area of nonconductive material positioned between said second and third area, a movable finger having an end positioned in contact with said selected surface, means for measuring the instantaneous speed of said vehicle, means for displacing said finger in the coordinate direction representing speed in dependency upon the value of said instantaneous speed, means for measuring the instantaneous distance of the vehicle from said reference point, means for moving said movable member in the coordinate direction representing distance in dependency upon the value of said instantaneous distance, and comparing means connected between said surface and finger for comparing the values of said instantaneous and optimum speed at said instantaneous distance.

References Cited by the Examiner
UNITED STATES PATENTS

| | | | |
|---|---|---|---|
| 2,225,709 | 12/40 | Neal et al. | 73—115 X |
| 2,278,219 | 3/42 | Shanley | 73—178 |
| 2,391,896 | 1/46 | Hanson | 244—78 |
| 2,500,545 | 3/50 | Herbst | 73—178 X |
| 2,530,351 | 11/50 | Fales | 340—213 |
| 2,706,407 | 4/55 | Hosford | 73—182 |
| 2,766,954 | 10/56 | Schuck | 244—77 |
| 2,799,461 | 7/57 | Anderson et al. | 244—77 |
| 2,807,165 | 9/57 | Kuzyk et al. | 73—178 |
| 2,902,236 | 9/59 | Yost | 244—77 |

ROBERT B. HULL, *Primary Examiner.*

M. L. MARLAND, MILTON BUCHLER, ISAAC LISANN, *Examiners.*